Figure 1:
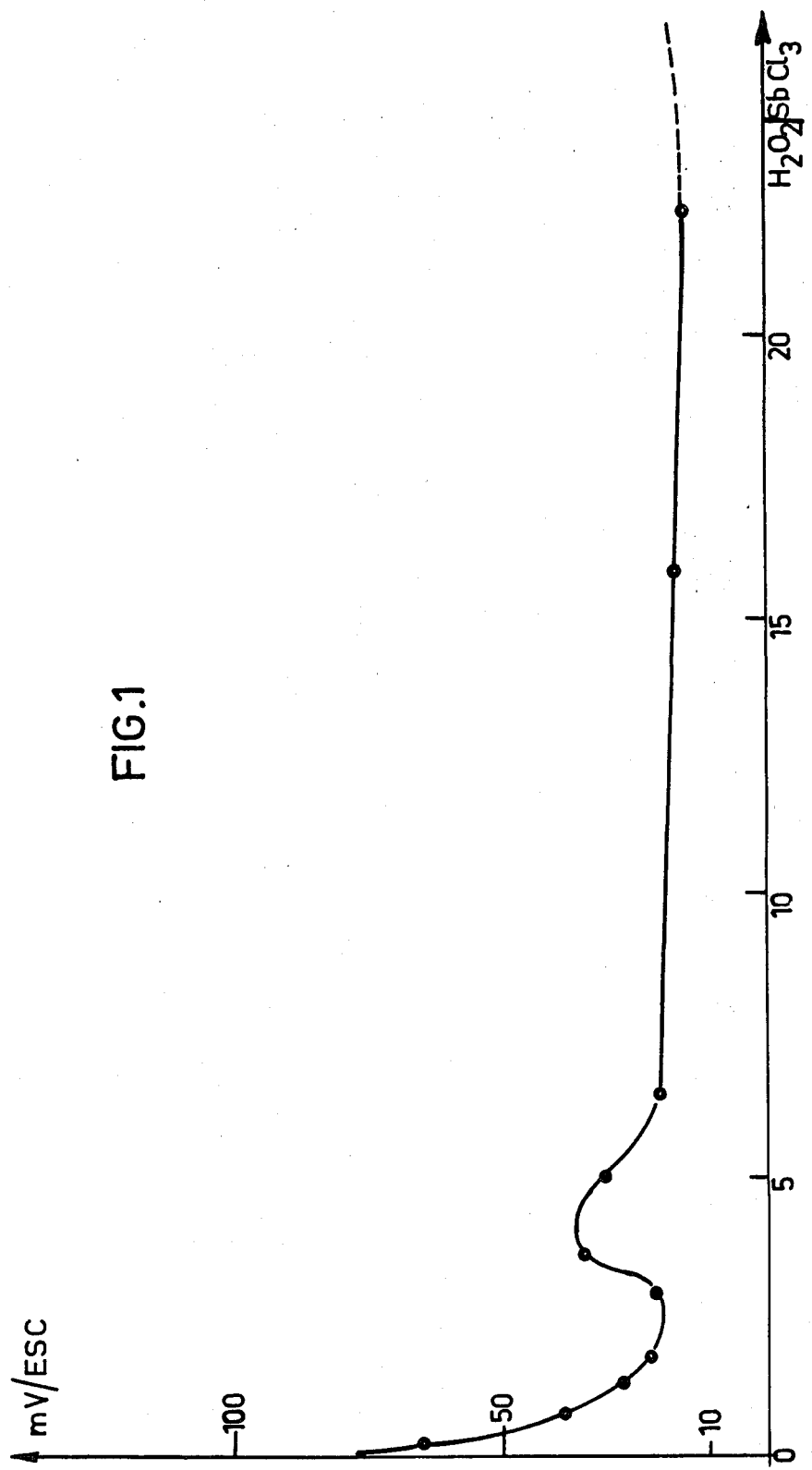

United States Patent [19]

Bloise et al.

[11] 4,401,644

[45] Aug. 30, 1983

[54] METHOD FOR OBTAINING SENARMONTITE AND SENARMONTITE THUS OBTAINED

[75] Inventors: René Bloise, Saint Denis en Val; Georges Morizot, Olivet; Geneviève Boissonnade, Le Pecq, all of France

[73] Assignee: Bureau de Recherches Géologiques et Minieres, Paris, France

[21] Appl. No.: 292,259

[22] Filed: Aug. 12, 1981

[30] Foreign Application Priority Data

Aug. 12, 1980 [FR] France .............................. 80 17802

[51] Int. Cl.³ .......................................... C01B 27/00
[52] U.S. Cl. ..................................................... 423/617
[58] Field of Search ....................................... 423/617

[56] References Cited

U.S. PATENT DOCUMENTS

| | | | |
|---|---|---|---|
| 2,200,478 | 5/1940 | Schirrmeister | 423/617 |
| 2,350,638 | 6/1944 | Podschus et al. | 423/617 |
| 3,917,793 | 11/1975 | Shafer | 423/617 |
| 3,998,940 | 12/1976 | Shafer | 423/617 |
| 4,216,199 | 8/1980 | Erickson | 423/657 |

FOREIGN PATENT DOCUMENTS 49-118697 11/1974 Japan ................................ 423/617

OTHER PUBLICATIONS

Kirk–Othmer, *Encyclopedia of Chemical Technology*, Second Edition, vol. 12, Interscience Publishers, (1966), pp. 573 and 574.

*Primary Examiner*—O. R. Vertiz
*Assistant Examiner*—Wayne A. Langel
*Attorney, Agent, or Firm*—Frost & Jacobs

[57] ABSTRACT

The invention relates to a process for obtaining senarmontite and obtained senarmontite.

The invention process consists in a direct hydrolysis of antimony trichloride by means of a basic solution, the hydrolysis being carried out in the presence of an oxidizing agent.

Use: Obtention of senarmontite.

9 Claims, 2 Drawing Figures

METHOD FOR OBTAINING SENARMONTITE AND SENARMONTITE THUS OBTAINED

The present invention relates to a process for producing photostable senarmontite and to senarmontite obtained by the process.

Senarmontite is one of the two polymorphic forms in which antimony trioxide exists. As a matter of fact, antimony trioxide exists under two polymorphic forms: the orthorhombic form, stable at high temperatures, which is valentinite and the cubic form stable at low temperatures, which is senarmontite.

Antimony trioxide can be made by hydrolysis of antimony trichloride. Depending on the operating conditions for the hydrolysis (dilution of the reaction medium, temperature, proportions of the reagents, etc) antimony oxychlorides or one or other of the polymorphic forms of antimony trioxide are obtained.

The following reactions have been proposed (Hentz et al, J. Chem. Educ. (1975)52(3) pp 189–190):

$$SbCl_3 + H_2O \rightleftharpoons SbOCl + 2HCl$$

$$4SbCl_3 + 5H_2O \rightleftharpoons Sb_4O_5Cl_2 + 10HCl$$

$$2SbCl_3 + H_2O \rightleftharpoons Sb_2OCl_4 + 2HCl$$

$$2SbCl_3 + 3H_2O \rightleftharpoons Sb_2O_3 + 6HCl$$

Two defined compounds of formulae SbOCl and $Sb_4O_5Cl_2$ have been identified when hydrolysis is effected at ambient temperature (Lea and Wood J. Chem. Soc.(1924)125-p 137–148). Before the formation of these stable phases, ill-defined oxychlorides form. These are compounds of formulae $Sb_4O_3(OH)_3Cl_3$ and $Sb_4O_3(OH)_3Cl$. When hydrolysis is effected in very dilute medium, valentinite ($Sb_2O_3$) is formed, on which an adsorption of hydrochloric acid arises.

Belluomini et al (Period. Mineral.(Rome)(1967) 36 pp 147–195) have studied the antimony oxychlorides obtained by hydrolysis at room temperature and at boiling point. At room temperature, two oxychlorides are obtained: $Sb_4O_5Cl_2$ and the $\gamma$ phase $[Sb_8O_8(OH)_4][(OH)_{2-x}H_2O_{1+x}]Cl_{2+x}$.

In table 1 hereinafter, the operating conditions which, according to the authors, produce these difference compounds are set out:

TABLE 1

Nature of the different oxychlorides obtained according to the operating conditions:

| Hydrolysis temperature | Nature of formed product | Concentration of Cl ions in Reaction Medium |
|---|---|---|
| 25° C. | $Sb_8O_8(OH)_4[(OH)_{2-x}(H_2O)_{1+x}]Cl_{2+x} = "\gamma"$ | 0.006–0.164 |
| 25° C. | "$\gamma$" + $Sb_4O_5Cl_2$ | 0.164–0.214 |
| 100° C. | $Sb_2O_3$ | 0.013–0.059 |
| 100° C. | $Sb_8O_{11}Cl_2 + Sb_2O_3$ | 0.036–0.067 |
| 100° C. | $Sb_8O_{11}Cl_2$ | 0.079–0.109 |
| 100° C. | $Sb_8O_{11}Cl_2 + Sb_2O_5Cl$ | 0.120–0.177 |

With hydrolysis at the boiling temperature, the different oxychlorides set out above are obtained. However, for high concentrations of chloride ions, an oxychloride of formula $Sb_8O_{11}Cl_2$, corresponding to the non-hydrated $\gamma$ phase, is obtained, and for low concentrations, antimony trioxide is obtained.

Moreover, it has been observed that, to obtain an antimony-trioxide without using a very dilute medium, it was necessary to use a basic medium, which ensured neutralisation of the hydrochloric acid formed in the course of the hydrolysis. The reaction equation is the following one:

$$2SbCl_3 + 6MOH \rightarrow Sb_2O_3 + 6MCl + 3H_2O \text{ with}$$
$$M = NH_4^+, Na^+ \text{ etc.}$$

The antimony trioxide thus obtained is generally valentinite which is photosensible. It changes colour and becomes grayish when exposed to light(Trans Faraday Soc.(1940)36 pp 433–440).

The sensibility can be eliminated by heating in an inert atmosphere at 400°–500° C. or under vacuum at 250° C., but this heat treatment results in an increase in the granulometry of the product.

Different processes for the production of antimony trioxide have been proposed. In this regard, reference can be made to the following patents:

U.S. Pat. No. 3,676,362 discloses a process for producing metal oxide sols in polar organic solvents by reaction of a soluble salt of the metal with water and the ammonia in a liquid solution. This reaction results in a metal oxide in a colloidal dispersion and an insoluble ammonium salt which precipitates and is withdrawn by filtration. It is indicated in U.S. Pat. No. 3,676,362 that the quantity of water should be at least equal to the stoechiometric quantity required for transforming the metal salt into the corresponding oxide, but it should not be in significant excess relatively to the quantity required to transform the salt into metal hydroxide. The precipitation reaction with ammonia is carried out preferably at a temperature between 0° and 100° C. The ammonia concentration must be lower than the concentration necessary for the complete neutralisation of the chloride anion. A portion of the anion can be left in the dispersion to stabilize the colloidal particles of metal oxides and to prevent the formation of a gel. This process permits the direct production of a dispersion of metal oxides in an organic solvent, which is also a solvent of polymers such as vinylpolychloride. Its incorporation in these polymers as a fireproofing agent can be readily carried out.

French Pat. No. 72 33 670 (published under No. 2 153 422) and U.S. Pat. No. 3,944,653, deal with the production of antimony trichloride of high purity. It is indicated that the antimony trichloride so obtained is an ideal intermediate product for direct transformation into antimony oxide of high purity by hydrolysis in a basic solution. This transformation can be achieved by hydrolysis with an aqueous basic solution of ammonium hydroxide, an alkaline hydroxide, an alkaline carbonate or a similar compound capable of reacting with antimony trichloride to form a solid antimony oxide. Hydrolysis can be made at a temperature between the freezing point and the boiling point of the aqueous solution.

French Pat. No. 74 06 661 (published under No. 2 219 904) deals with the production of antimony oxide (III) which is light-stable, notably senarmontite, by direct hydrolysis of antimony trichloride with a forming agent of antimony complexes, the molar ratio of the antimony trichloride to the forming agent being not above 5. Ethylene-diamine-tetra-acetic acid, nitrilo-triacetic acid, tartaric acid and the polyhydric alcohols are cited as examples of forming agents of antimony complexes.

Hydrolysis reaction is effected between the freezing point and 100° C. at a pH between 7 and 10.

French Pat. No. 74 06 662 (published under No. 2 219.905) deals with a process for producing senarmontite. The process consists in hydrolysing antimony trichloride at a temperature not above 40° C. in an aqueous hydrolysis system containing free chloride ions and having a pH between 7 and 10 and withdrawing the senarmontite from the system.

It is indicated in this patent that high temperatures, weak concentration of chloride ions and a high pH in a hydrolysis system lead to the formation of valentinite, and that low temperatures, low pH and a high concentration of chloride ions in a hydrolysis system lead to the formation of different antimony oxychlorides. Hydrolysis is carried out for between 10 and 30 minutes.

French Pat. No. 857,234 relates to a process for producing valentinite by hydrolysis at a temperature between freezing point and about 35° C., with very high stirring until the formed precipitate becomes finely crystalline, and subsequent treatment of the product of the hydrolysis with alkaline solutions, for example, solutions of sodium carbonate, and possibly a further heat treatment, for example, at a temperature between 350° C. and 420° C., this treatment being advantageously carried out in the absence of oxygen.

U.S. Pat. No. 2,350,638 also deals with the production of antimony trioxide in the orthorhombic form, which comprises the hydrolysis of the antimony trichloride followed by a treatment with an alkaline solution followed by a heat treatment at a temperature between 300° and 450° C. in excluding oxygen.

DE-OS patent application No. 2,545,221 relates to the production of antimony trioxide from worn antimony V chloride catalysts. The antimony V chloride, after separation of organic products, is reduced to antimony III with sulphurous anhydride, antimony, iron or zinc. The compound antimony III is then submitted to an hydrolysis in a reducing and acid medium (for example in the presence of hydrazine, bisulphite, ascorbic acid) which leads to the formation of oxychloride. The hydrolysis may be effected in the presence of a complexant. The resulting oxychloride is then subjected to conventional basic hydrolysis to form an antimony oxide, the crystalline structure of which is not indicated, but which is white and of a "chemically pure" quality.

DE-OS Patent application No. 2,733,117 relates to a process of extraction for the recovery of antimony trioxide from sulphured and oxidized mineral ores. This process notably comprises an hydrolysis step of a solution of antimony III leading to the formation of oxychlorides, followed by a basic treatment.

The abundant state of the art in this field shows, on one hand, that an antimony trioxide of high purity is always searched, and, on the other hand, that modifications of the operating conditions in the hydrolysis of antimony trichloride have a considerable influence on the properties of the searched product.

Up to now, senarmontite has, as far as the applicant is aware, been obtained by pyrometallurgy or by direct hydrolysis of antimony trichloride, either in the presence of an antimony complex forming agent or at a temperature below 40° C. in the presence of free chloride ions at a pH between 7 and 10. Treatment at low temperature requires a cooling of the reaction medium since hydrolysis is exothermic. Use of a complexing agent implies the use of very dilute solutions for the hydrolysis.

A process has been now found which enables photostable senarmontite to be produced easily and selectively and with a high yield.

The process according to the present invention for the production of photostable senarmontite by direct hydrolysis of antimony trichloride consists in carrying out the hydrolysis in the presence of an oxidizing agent.

As a matter of fact, it was found that the basic hydrolysis carrying out in the presence of an oxidizing agent in appropriate quantities leads to the formation of senarmontite. The required quantity of the oxidizing agent should be less than the quantity necessary to produce antimony pentoxide. It has also been noted that with small quantities of oxidizing agent there is formation of valentinite, then of a mixture of valentinite and senarmontite; and that, for each given oxidizing agent there exists a particular range of oxidizing agent to produce senarmontite. Since these different products are distinguished by their crystallographic structure, it will be easy for a person skilled in the art to determine, in relation to determined operating conditions (temperature, nature of the hydrolysis solution, $SbCl_3$ concentration, average residence times, etc) the quantity of oxidizing agent to be used for each given oxidizing agent.

The senarmontite obtained according to the process of the invention is photostable, that is to say the yellow Y index varies only between 1 and 10 and does not exceed this upper limit after exposure of 48 hours to ultra-violet rays.

The yellow index allows the photosensibility of the product to be easily determined. It is calculated by the formula:

$$Y = \frac{I \text{ amber} - I \text{ blue}}{I \text{ green}} \times 100$$

in which I is the luminous energy reflected by the sample for various wavelengths of visible light (amber: 580–595 nm; blue: 460–480 nm, and green: 500–530 nm). These luminous energies are measured by means of a reflectometer "photovolt 670" (sold by PARIS-LABO) on an antimony trioxide pellet. The yellow Y index is measured before and after exposure to UV radiation. The samples are subjected to UV radiation by means of a R 52 lamp (mineralight type) of 55 W power (sold by VILBER LOURMAR) at a distance between 14 and 18 cm for 24 to 48 hours. The lower the yellow index, the whiter the product produced. This index allows to compare by a simple manner the products with each other.

As oxidizing agents suitable for the purposes of the invention there may be cited oxygen, hydrogen peroxide, sodium hypochlorite and similar oxidizing agents.

It was found that the oxydo-reduction potential varies with the quantity of oxidizing agent used, but presents a stationary phase for a range of oxidizing agent, and that this stationary phase corresponds to the selective formation of extremely light-stable senarmontite. When the oxidizing agent used is insufficient in quantity in order that the oxydo-reduction potential is within this range, a mixture of senarmontite-valentinite is produced, or a senarmontite, the yellow index of which varies between 1 and 10. On the other hand, when the quantity of oxidizing agent is such that the oxydo-reduction potential is beyond this range, antimony pentoxide is formed.

According to a particularly preferred embodiment of the process of the invention, basic hydrolysis of antimony trichloride is carried out in the presence of an oxidizing agent in a sufficient quantity for the oxydo-reduction potential of the hydrolytic medium to be in the stationary phase. The senarmontite obtained in these preferred conditions is extremely light-stable, that is to say its yellow Y index is of the order of 2,5 to 3 and does not exceed about 7 after UV exposure for 48 hours.

The quantity of oxidizing agent to be used, according to the preferred process of the invention, will be determined by preliminary test for each oxidizing agent according to the procedure which consists in:

measuring the oxydo-reduction potential, with a platinum electrode and a reference electrode of saturated calomel, of an hydrolysis medium constituted by an aqueous solution of antimony trichloride and a basic solution containing increasing quantities of the considered oxidizing agent, at a given temperature;

drawing a curve giving the oxydo-reduction potential in function of the ratio of oxidizing-agent/antimony trichloride.

The quantity of oxidizing agent to be used corresponds to the quantity necessary for the oxydo-reduction potential to be in the stationary range, which is expressed by a flat portion of the curve which indicates the quantity of the particular considered oxidizing agent.

It will be easy for the one skilled in the art to establish, for each hydrolysis medium and for a given oxidizing agent, the curve which gives the oxydo-reduction potential as a function of the molar ratio oxidizing agent/antimony trichloride.

As an example, where the oxidizing agent is hydrogen peroxide, and the basic solution is an ammoniacal solution, the quantity of hydrogen peroxide may vary between 0,4 and 5% by weight at a hydrolysis temperature between 0° and 100° C. depending on the weight of the antimony trichloride.

When the solution is a sodium solution, the quantity of hydrogen peroxide to be used will be comprised between 1.4 and 8% by weight of the antimony trichloride.

When the oxidizing agent is sodium hypochlorite and the basic solution is an ammoniacal solution, the quantity suitable for the purpose of the invention is, at 40° C., comprised between 5 and 15% by weight of the antimony trichloride.

The antimony trichloride used, according to the invention, may be obtained by any method, for example, by selective extraction process described in French Pat. No. 76,08 963 in the name of the applicant.

The hydrolysis according to the invention is a basic hydrolysis, which is carried out by means of an appropriate solution, such as an ammoniacal solution, a sodium solution, a solution of sodium carbonate or any like solution, preferably an ammoniacal solution.

The process of the invention may be carried out at any temperature comprised between 0° and 100° C. The pH of the hydrolysis medium, measured at room temperature, may vary between about 7 and 12.

The present invention will be now described in greater detail by means of the illustrative examples hereunder, which however present no limiting character.

EXAMPLES

Antimony trichloride obtained by the process described in French Pat. No. 76 08 963 was used.

In a thermostatically controlled reactor at 20°, 40° and 80° C. and under stirring of 330 rpm, an aqueous solution of antimony trichloride (0.343 M/h or 0.363 M/h) was continuously introduced at the same time as an ammoniacal solution containing the oxidizing agent. The reagent quantity was so selected that the $Sb_2O_3$ concentration (solids ratio) is 50 g/l. The pulp was withdrawn continuously after an average residence time of 30 minutes or one hour, and then filtered. The filtration cake was then washed with warm water and dried at 110° C.

Different tests were carried out under the above operating conditions using varying quantities of oxidizing agent. For each test, there was noted the pH and the oxydo reduction potential of the hydrolysis solution, as well as the crystalline nature of the formed precipitate by X-ray diffraction, and the yellow index of the precipitate. The obtained results as well as the quantities of reagents are shown in table II below.

On the annexed FIG. 1, it was established the curve giving the oxydo-reduction potential (ordinates) as a function of the molar ratio $H_2O_2/SbCl_3$ in the hydrolysis medium. It was noticed that the oxydo-reduction potential decreases and slightly increases as the quantity of oxidizing agent increases and then decreases, becomes stationary and increases. In considering the results in table I, it is noticed that, when the quantity of oxidizing agent used corresponds to an oxydo-reduction potential in the stationary phase, the product obtained is an extremely photo-stable senarmontite. When the amount of oxidizing agent corresponds to the decreasing phase of the oxydo-reduction potential which immediately precedes the stationary phase, photostable senarmontite is obtained, that is to say the yellow index of which is between 1 and 10 and does not exceed this upper limit after exposure of 48 hours to UV radiation.

Figure 2:
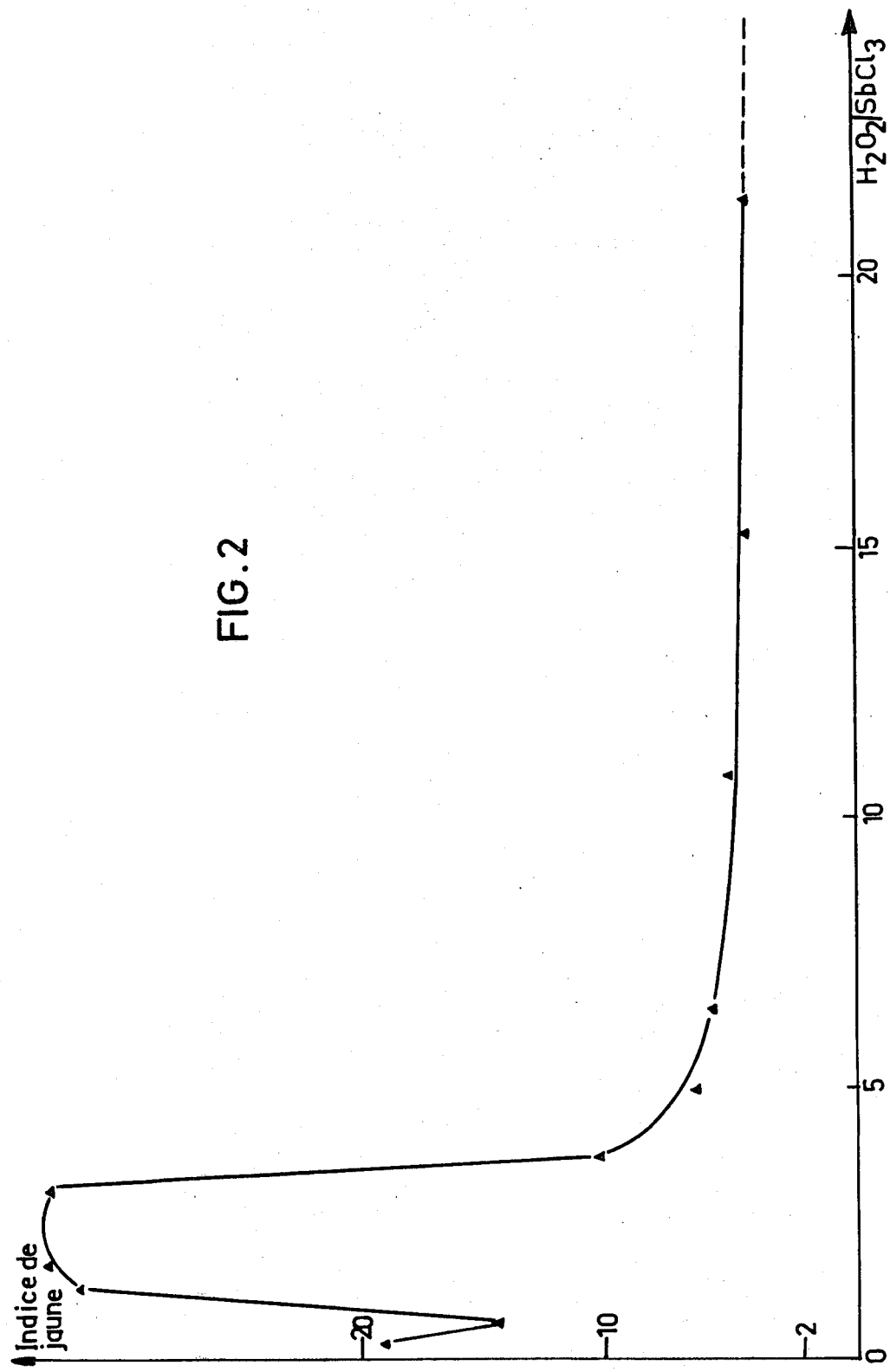

On FIG. 2, there was plotted a curve giving the yellow index of the obtained product (after UV exposure for 24 hours) as a function of the molar ratio $H_2O_2/SbCl_3$. It is noticed that when the quantity of oxidizing agent corresponds to the stationary phase of the hydrolysis medium the yellow index Y is low and substantially stable. The result is that the obtained product is photo-stable.

The granulometry of the product obtained according to test 46 was determined: 50% by weight of the obtained product have a granulometry lower than 2.8 μm, which defines the average diameter of the particles.

Following the operating procedure set out above, tests were carried out in using:
1. hydrogen peroxide as oxidizing agent and sodium hydroxide as the basic solution, and
2. sodium hypochlorite and ammonia as the basic solution.

The operating conditions and the results obtained are set out in table II.

TABLE II

| OBTENTION OF SENARMONTITE | | | | | |
|---|---|---|---|---|---|
| Experimental conditions | | | Yield | | |
| Average | Molar % | | of | | |
| residence | Oxidizing | V | hydro- | Yellow Index Y | Average |

TABLE II-continued

OBTENTION OF SENARMONTITE

| T° C. | time (hours) | agent SbCl₃ | pH | mV/E C.S | lysis % | Characteristics | Period of exposure 0 h | 24 h | 48 h | diameter of particles |
|---|---|---|---|---|---|---|---|---|---|---|
| Oxidizing agent = H₂O₂ Base = ammonia | | | | | | | | | | |
| 80 | 1 | 200 | — | — | — | amorphous product tending to pentoxide | 3.0 | 7.0 | 8.0 | |
| 80 | 0.5 | 10.2 | 7.5 | +14 | 99.1 | senarmontite | 3.0 | 4.0 | 7.0 | 3,8 μm |
| 40 | 0.5 | 36.7 | 7.4 | +45 | 99.1 | amorphous product | 2.5 | 3.0 | 3.0 | |
| 40 | 0.5 | 28.6 | 7.5 | +25 | 99.2 | slightly crystalline senarmontite | 2.0 | 3.5 | 4.0 | |
| 40 | 0.5 | 20.4 | 7.8 | +13 | 99.2 | slightly crystalline senarmontite | 2.5 | 3.8 | 4.5 | 3.5 μm |
| 40 | 0.5 | 14.3 | 7.5 | +14 | 99.4 | senarmontite | 2.8 | 4.1 | 4.5 | 5 μm |
| 40 | 0.5 | 10.2 | 7.5 | +14 | 99.4 | senarmontite | 3.0 | 4.2 | 4.5 | 2.8 μm |
| 40 | 0.5 | 6.1 | 7.5 | +18 | 99.4 | senarmontite | 3.0 | 5.0 | 7.0 | 2.8 μm |
| 40 | 0.5 | 3.2 | 7.5 | +32 | 99.6 | senarmontite | 3.1 | 9.0 | 9.0 | below μm |

| Experimental Conditions | | | | yield of hydro- lysis | | Yellow Index Y Period of exposure | | | Average diameter of |
|---|---|---|---|---|---|---|---|---|---|
| T° C. | Average residence time (hours) | Molar % Oxidizing agent SbCl₃ | pH | % | Characteristics | 0 h | 24 h | 48 h | particles |
| Oxidizing agent = H₂O₂ Base = Sodium hydroxide | | | | | | | | | |
| 40 | 0.5 | 2.5 | 7.5 | +20 | | senarmontite and valentinite | 22.0 | 29.0 | 31.0 | |
| 40 | 0.5 | 1.5 | 7.5 | +21 | | valentinite and senarmontite | 20.0 | 33.0 | 36.0 | |
| 40 | 0.5 | 0.7 | 7.5 | +35 | 99.9 | valentinite and senarmontite | 14.0 | 28.0 | 28.5 | |
| 40 | 0.5 | 0.35 | 7.7 | +12 | 99.9 | valentinite | 9.0 | 14.5 | 15.5 | |
| 40 | 0.5 | 0.25 | 7.6 | +58 | 99.9 | valentinite | 8.8 | 14.5 | 15.5 | |
| 40 | 0.5 | 0 | 7.6 | +73 | 99.9 | valentinite | 2.9 | 17.0 | 19.0 | |
| 20 | 0.5 | 10.2 | 7.7 | +53 | 99.8 | senarmontite | 3.0 | 4.0 | 4.5 | 3,2 μm |

| Experimental Conditions | | | | Product of hydro- lysis | | Yellow Index Y | | | Average diameter of |
|---|---|---|---|---|---|---|---|---|---|
| T° C. | Average residence time (hours) | Molar % Oxidizing agent SbCl₃ | pH | % | Characteristics | 0 h | 24 h | 48 h | particles |
| Oxidizing agent = H₂O₂ Base = sodium hydroxide | | | | | | | | | |
| 40 | 0.5 | 5 | 8.5 | −40 | 99.9 | valentinite | 4 | 7 | 8 | |
| 40 | 0.5 | 10 | 7.4 | −95 | 99.9 | senarmontite | 7 | 17 | 19 | |
| oxidant = sodium hypochlorite base = ammonia | | | | | | | | | |
| 40 | 0.5 | 5 | 7.5 | −103 | | valentinite | 6 | 15 | 20 | |
| 40 | 0.5 | 10 | 7.5 | −160 | | valentinite | 7 | 13 | 15 | |
| 40 | 0.5 | 15 | 7.4 | +5 | | senarmontite | 3 | 5 | 7 | 3,5 μm |

We claim:

1. A process for producing synthetic photostable senarmontite by direct hydrolysis of antimony trichloride by means of a basic solution, characterized in that the hydrolysis is carried out in the presence of an oxidizing agent; the quantity of oxidizing agent being sufficient for the oxydo-reduction potential of the hydrolysis medium to be in its stationary phase; and the oxidizing agent being selected from the group consisting of oxygen, hydrogen peroxide, and sodium hypochlorite.

2. A process for producing synthetic photostable senarmontite by direct hydrolysis of antimony trichloride by means of a basic solution, characterized in that the hydrolysis is carried out in the presence of hydrogen peroxide as an oxidizing agent and the basic solution is an ammoniacal solution; in that the hydrogen peroxide is used in an amount between 0.4 and 5% on the basis of the weight of the antimony trichloride; and in that the hydrolysis temperature is comprised between 0° and 100° C.

3. The process according to claim 2, wherein the quantity of oxidizing agent is sufficient for the oxydo-reduction potential of the hydrolysis medium to be in its stationary phase.

4. A process for producing synthetic photostable senarmontite by direct hydrolysis of antimony trichloride by means of a basic solution, characterized in that the hydrolysis is carried out in the presence of hydrogen peroxide as an oxidizing agent and the basic solution is a sodium hydroxide solution; and in that the hydrogen peroxide is used in an amount between 1.4 and 8% on the basis of the weight of the antimony trichloride, the temperature of the hydrolysis being about 40° C.

5. The process according to claim 4, wherein the quantity of oxidizing agent is sufficient for the oxydo-reduction potential of the hydrolysis medium to be in its stationary phase.

6. A process for producing synthetic photostable senarmontite by direct hydrolysis of antimony trichloride by means of a basic solution, characterized in that the hydrolysis is carried out in the presence of sodium hypochlorite as an oxidizing agent and the basic solution is an ammonia solution and in that the oxidizing agent is used in an amount between 5 and 15% on the basis of weight of the antimony trichloride.

7. The process according to claim 6, wherein the quantity of oxidizing agent is sufficient for the oxydo-reduction potential of the hydrolysis medium to be in its stationary phase.

8. The process of any one of claims 2 to 7, characterized in that the hydrolysis is carried out at a temperature between 0° and 100° C.

9. The process of any one of claims 2 to 7, characterized in that the pH, as measured at ambient temperature, is between 7 and 12.

* * * * *